(12) United States Patent
Bowman et al.

(10) Patent No.: US 10,402,558 B2
(45) Date of Patent: Sep. 3, 2019

(54) DEVICE RESTRICTIONS DURING EVENTS

(71) Applicant: BlackBerry Limited, Waterloo (CA)

(72) Inventors: Roger Paul Bowman, Waterloo (CA); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 158 days.

(21) Appl. No.: 15/381,942

(22) Filed: Dec. 16, 2016

(65) Prior Publication Data

US 2018/0173868 A1      Jun. 21, 2018

(51) Int. Cl.
*H04M 3/38* (2006.01)
*H04M 3/56* (2006.01)
*G06F 21/44* (2013.01)
*G06F 21/45* (2013.01)
*H04W 48/02* (2009.01)

(52) U.S. Cl.
CPC .............. *G06F 21/44* (2013.01); *G06F 21/45* (2013.01); *H04M 3/38* (2013.01); *H04M 3/56* (2013.01); *H04W 48/02* (2013.01); *H04M 3/567* (2013.01); *H04M 2203/1016* (2013.01); *H04M 2203/2005* (2013.01); *H04M 2203/6081* (2013.01); *H04M 2242/14* (2013.01)

(58) Field of Classification Search
CPC . H04M 2203/2005; H04M 2203/6081; H04M 2242/14; H04W 48/02; H04W 12/005; H04W 12/00503; H04W 12/00504; G06F 21/577; G06F 2221/2111
See application file for complete search history.

(56) References Cited

U.S. PATENT DOCUMENTS

| 7,929,960 | B2 | 4/2011 | Martin et al. |
| 8,078,869 | B2 | 12/2011 | Adams et al. |
| 8,386,778 | B2 | 2/2013 | Adams et al. |
| 8,548,452 | B2 | 10/2013 | Coskun et al. |
| 9,154,469 | B2 | 10/2015 | Adams et al. |

(Continued)

FOREIGN PATENT DOCUMENTS

| EP | 3337149 | 6/2018 |
| WO | 2004077782 | 9/2004 |
| WO | 2015102186 | 7/2015 |

OTHER PUBLICATIONS

U.S. Appl. No. 15/255,960, filed Sep. 2, 2016, BlackBerry Limited.

(Continued)

*Primary Examiner* — Daniel B Potratz
*Assistant Examiner* — Vu V Tran
(74) *Attorney, Agent, or Firm* — Jeffrey N. Giunta; Fleit Gibbons Gurman Bongini & Bianco P.L.

(57) ABSTRACT

A system and method for controlling functions on devices is disclosed. An occurrence of a start of an event is determined. Based on determining the occurrence of the start, a respective registration of a respective device associated with a respective attendee of the event is received. Based on receiving the respective registration and determining the occurrence of the start of the event, temporary restrictions are applied to the respective device from which the respective registration is received. Based on determining an occurrence of an end of the event, the temporary restrictions are removed from the respective device.

16 Claims, 6 Drawing Sheets

(56) References Cited

U.S. PATENT DOCUMENTS

| | | | |
|---|---|---|---|
| 9,178,699 B2 | 11/2015 | Lambert et al. | |
| 2007/0243862 A1* | 10/2007 | Coskun | G06Q 10/10 |
| | | | 455/418 |
| 2007/0250627 A1* | 10/2007 | May | G06F 21/56 |
| | | | 709/225 |
| 2007/0270167 A1* | 11/2007 | Mardiks | H04W 48/04 |
| | | | 455/456.4 |
| 2008/0270211 A1* | 10/2008 | Vander Veen | G06Q 10/107 |
| | | | 705/7.19 |
| 2009/0253410 A1* | 10/2009 | Fitzgerald | G06F 21/88 |
| | | | 455/411 |
| 2011/0314392 A1* | 12/2011 | Howarth | G06F 21/6218 |
| | | | 715/753 |
| 2012/0011561 A1* | 1/2012 | Courtney | G06F 21/604 |
| | | | 726/1 |
| 2015/0237498 A1* | 8/2015 | Freedman | H04W 8/22 |
| | | | 455/419 |
| 2017/0012946 A1 | 1/2017 | Lambert et al. | |

OTHER PUBLICATIONS

Extended European Search Report dated Jan. 24, 2018, for European Application No. 17204172.5.
Communication pursuant to Article 94(3) EPC dated May 2, 2019 for European patent application No. 17204172.5.

* cited by examiner

DEVICE RESTRICTIONS DURING EVENTS

FIELD OF THE DISCLOSURE

The present disclosure generally relates to electronic device operations, and more particularly to restricting selected functions of electronic devices.

BACKGROUND

Electronic devices, such as smartphones, computers, and the like, include various functions, such as capturing and sending images or sounds collected by various sensors such as cameras and microphones, that can affect the security of the environment in which the electronic devices are present. Inadvertent or unauthorized activation of these functions may be a concern in some environments, particularly during certain events such as meetings in which sensitive matters or materials are discussed or presented. At some such events, electronic devices have to be checked at the door. Checking devices at the door of an event, and then having to retrieve them after the event, may be inconvenient and time consuming for both attendees and hosts of the event.

Many electronic devices include facilities for disabling functions, but configuring all of the required functions to be disabled can be manually intensive. Further, relying on individual configurations for an event may not be sufficiently reliable to fully ensure that all devices taken into an event have disabled all functions that the event host requires to be disabled. Further, some functions that should be disabled may be enabled on some devices during the event either inadvertently, unintentionally, intentionally, through surreptitious techniques, for other reasons, or combinations of these. Also, re-enabling the functions that were disabled for the event can be laborious for the user of the device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
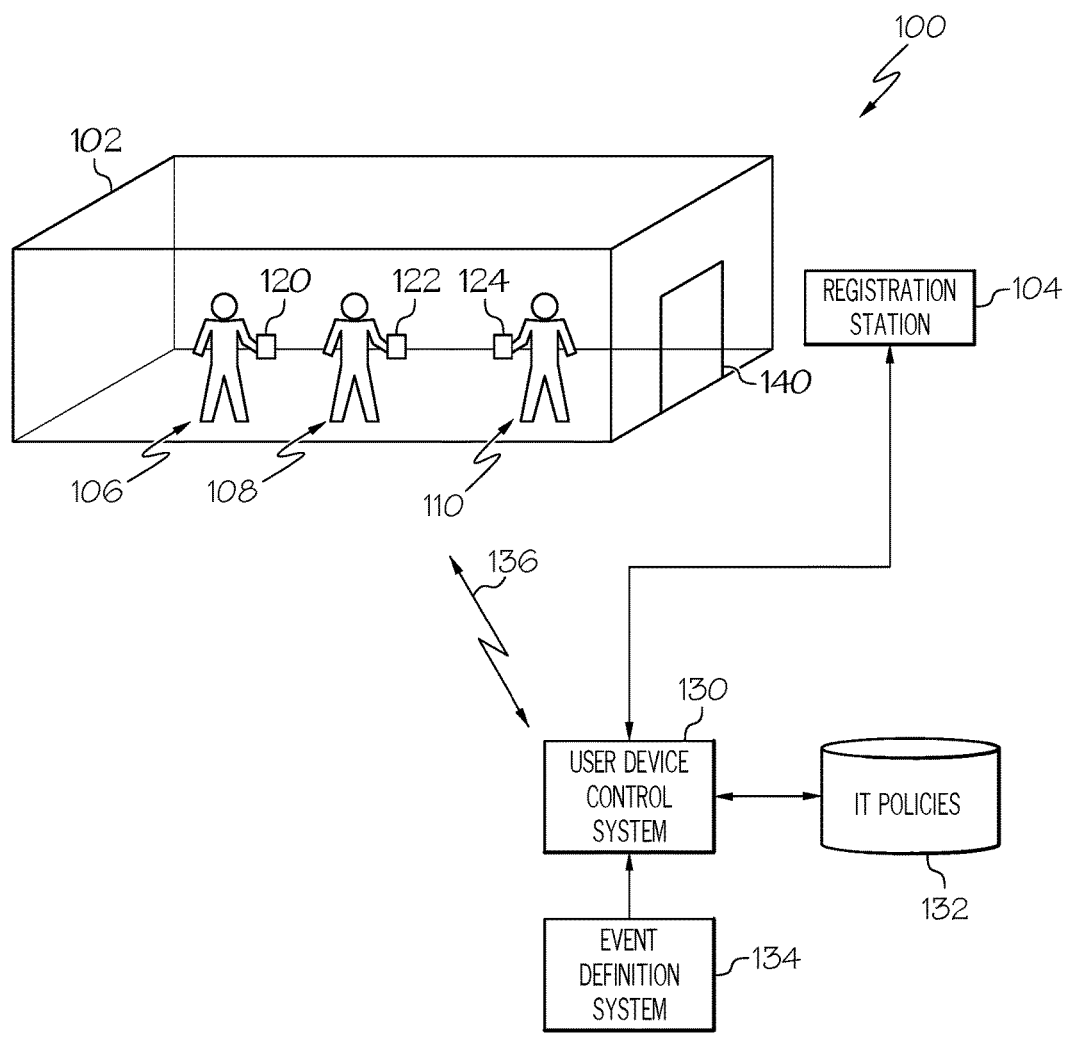
FIG. 1 illustrates a device restricted event, according to an example.

Detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide an ability to control functions within devices associated with attendees of an event. In the following discussion, control of a particular function is referred to as applying a restriction on the device for that function. A restriction in this context is intended to be broadly understood to include any type of control on the function including, without limitation, disabling the function, reducing the extent of operation of the function, performing any other control on the function, or combinations of these. In some examples, implementing a control on a device may involve applying a restriction that reduces limitations that were imposed on the device. For example, a device may have a first configuration that prohibits accessing certain external servers or functions. In such an example, a temporary restriction may be imposed on the device that allows the device to access some of those external servers or functions. In that example, a restriction is imposed on the device that is less restrictive that its previous first configuration.

In general, the systems and methods described below are applicable to any type of device. In various examples, these systems and methods are applicable to any type of electronic device that is able to be used in any type of operational environment. For example, these systems and methods can be incorporated into one or more of portable electronic devices, which include devices that are easily carried by a person or other carrier; or mobile devices, which include devices mounted in movable systems such as vehicles of any type. In various examples, these electronic devices are able to be located in vehicles that include, but are not limited to, motor vehicles (e.g., cars), but also aircraft, spacecraft, watercraft, railed vehicles, or other vehicles. These electronic devices are also able to include fixed devices, which include devices that are not designed to be easily or often relocated such as desktop electronic equipment; other types of electronic equipment, or combinations of these.

In an example, an event is able to be a scheduled meeting in which sensitive information will be discussed and presented. The organizer or host of this meeting may require, for example, that all electronic devices brought into the meeting have their cameras and microphones disabled in order to prevent an attendee from recording any of the information that is discussed or presented. In that example, temporary restrictions to be specified for this event, i.e., the meeting in this example, include disabling the camera and disabling the microphone of each electronic device brought into the event.

An organizer or host in an example is able to define various aspects of the event. Examples of data that can be included in the aspects of an event defined by an organizer or host are dependent upon the needs of the event or organizer. Examples of items defined as event aspects can include, for example, a start time and an end time for the event, a list of temporary restrictions applied to electronic devices brought into the event, control characteristics that are required of devices brought into the event, a specified list of attendees for the event, other aspects, or any combination of these. The event in various examples is able to be defined in various ways. In an example, a start time for the event is able to be specified. A duration or end time of the event is also able to be specified to define the time duration of the event during which temporary restrictions will be imposed on electronic devices within the event.

In an example, events are able to be defined without a pre-arranged schedule. For example, an organizer or host is able to define various characteristics of the event, such as control characteristics that are required of devices that are to be brought into an event, restrictions to be applied during the event, other aspects, or combinations of these. In an example, a start of an event is able to be determined based on devices registering for the event, such as by one or more of the techniques described below. The end of the event is then able to be determined when attendees register their departure from the event, when the host provides an indication of the end of the event, based on other techniques, or by combinations of these. Such events that do not have a pre-arranged schedule are referred to herein as ad-hoc events.

In defining an event, a host is able to specify control characteristics that are required to be present in devices that are allowed to be brought into the event. An example of such control characteristics that are required of devices brought into an event are pre-requisite characteristics of the device that are able to be categorized into 2 areas. A first area includes a control mechanism of the device that supports implementing a secure configuration. Examples of such secure configurations include, for example, specific security configurations that are already in place such as security configurations and functions to implement data protection, ensuring a device is enabled according to criteria set forth in accordance to techniques coordinated by the National Information Assurance Partnership (NIAP), other control mechanisms, or combinations of these. In addition to these control mechanisms, an event is able to specify that a device brought into the meeting is required to have a secure operational state, such as by verifying the device is secure and has no history of intrusions.

The below described systems and methods operate in an example to: 1) ensure that all devices entering the event have an ability to implement the specified temporary restrictions for the event; 2) impose those specified temporary restrictions on devices in the event for the duration of the event; and 3) remove those specified temporary restrictions from those devices after the event. In general, any function of an electronic device is able to be controlled or restricted by the below described systems and methods, for example, temporary restrictions are able to be placed upon functions related to the operation, use, other aspects, or combinations of those of, for example, GPS receivers or location reporting, Near Field Communications (NFC) devices, Bluetooth interfaces, other peripherals, or combinations of these.

In some examples, an event organizer is able to designate one or more users as "event hosts" of the event. In an example, event hosts are granted a temporary authority to impose temporary restrictions on other user devices that are to be imposed during a particular event. In an example, a user device control system such as an Information Technology (IT) policy server operating as part of or in conjunction with a Mobile Device Manager (MDM) system is able to provide facilities to control various functions of user devices. The event host in an example is temporally granted authority with the user device control system to control one or more functions of the devices used by attendees of the event. In an example, a host is able to operate by using any device associated with that host. Examples of devices associated with a host include, but are not limited to, any device assigned to that host, any device into which a host has entered identification credentials (such as login information), any device associated with the host according to any suitable criteria, or combinations of these.

In some examples, event hosts are able to perform actions to impose or modify temporary restrictions on devices carried into an event. For example, an event is able to be set up with specific start and end times where one or more event hosts are defined. The one or more event hosts in an example are granted proxy administrative capabilities by the user device control system for the duration of the event. The one or more event hosts in an example are then able to define or redefine temporary restrictions to be imposed on electronic devices that are brought into the event. In some examples, the control actions performed by the event hosts are logged by the device control system to support auditing of actions taken and the status of devices during the event.

As attendees arrive for the event, each attendee in an example registers his or her device. Registering a device may be performed via interaction with a registration device at or near the event, via interaction with a device associated with an event host, via any other technique, or combinations of these. For example, registration of a device is able to be based on an exchange of data using Near Field Communications, e.g., by using an "NFC tap" with a registration device placed near the event, with a device associated with one of the event hosts, with other devices, or with combinations of these. In some examples, a device is able to be automatically registered at the start of the event without the device interacting with a device at the event. In various examples, devices entering the event may register based on communicating, such as via an NFC tap, with other devices; automatically based on a occurrence of a start time of the event, by any suitable technique, or by combinations of these.

In an example, one or more actions are able to occur in response to a device registering its attendance at the event. For example, the functions of the device will be controlled or restricted in accordance to the temporary restrictions defined for the event (e.g. camera and microphone are disabled) when the device is registered. In some examples, the device provides authentication of device characteristics via a report of operational state and configuration settings and sends an authenticated report of its capabilities and verification of the successful implementation of the settings to implement the temporary restrictions defined for the event. In further examples, the host, administrator, other entity, or combinations of these, is given visibility to each registered device along with a selected set of device characteristics for each device. In an example, such reports, verification, and visibility are provided by user device control systems, such as Mobile Device Monitoring (MDM) systems and enterprise policy servers.

At the end of the event, each user registers his or her departure in an example and the temporary restrictions on his or her device are released. In an example, the standard IT policy settings defined for the device, such as by an enterprise IT policy server, are restored in each device. Registering a device's departure is able to be by any suitable technique, such as by an NFC tap with a device located near the event, with a device associated with an event host, with another device, by any other technique, or by combinations of these. In some examples, an administrator, an event host, another entity, or combinations of these, is notified immediately upon registration, such as immediately upon an NFC tap by an attendee's device, that the device's settings or other characteristics do not meet the requirements for the event. The event host in various examples is then able to take various actions, such as excusing the attendee from the event or requiring the attendee's device to be left at the door.

In an example, a geographic region, such as a meeting room, is able to be associated with the event, and registration of a device is able to be based on determining that the device is entering or is located within that geographic region. Departing the event is similarly able to be based on determining, in some examples, that the device is not in that geographic region or is leaving that geographic region.

In some examples, a meeting scheduling system is able to be used to automatically perform some or all functions associated with registration of arrival, registration of departure, other registrations, or combinations of these. In some of these examples, determinations based on time, locations of user devices, other determinations, or combinations of these, are able to be used in addition to, or in place of, an attendee's registration with an event host. For example, a meeting may be defined to have a list of attendees, have a list of temporary restrictions, occur between a start time and an end time, and to be held in a geographic region such as a meeting room. The meeting scheduling system is able to send meeting invitation to each attendee for this meeting. That invitation is able to include the above listed items specified for that meeting. The meeting scheduling system will keep track of which attendees have accepted the invitation. In one example, the temporary restrictions that are specified for this meeting are applied for the duration of the meeting to the devices of all attendees who accepted the invitation. In another example, the temporary restrictions are placed on all devices within the specified meeting room for the duration of the meeting.

In some examples, temporary restrictions are imposed on electronic devices via an enterprise user device control system such as an IT policy server operating with a Mobile Device Management (MDM) system. In an example, devices associated with individuals from different corporations or other entities are able to be controlled via, for example, inter-operating user device control systems that may implement a "secure community sever" concept.

In an example, pre-requisite device characteristics are able to be specified for devices that are allowed within an event. For example, an event may be set up to specify that all devices must support certain data protection techniques. In some examples, an event definition may specify that devices must be compliant with criteria defined by the National Information Assurance Partnership (NIAP). In an example, devices may be specified to require supporting certain data protection operations, such as operations or functions to protect Data At Rest.

In an example, the event definition may further specify device specific temporary restrictions to be imposed on functions of devices that are allowed into the event, such as a specification that the camera of the device is to be disabled for the duration of the event. In another example, temporary restrictions for an event are able to specify a limited number of restricted operations. For example, an event may have specified temporary restrictions that allow a certain number of pictures to be taken during the event by specified individuals within a specified time window or at a given physical location.

FIG. 1 illustrates a device restricted event 100, according to an example. The device restricted event 100 depicts an example of an event where a number of attendees are present within a room 102. In further examples, events are able to include function or experience with one or more attendees and can include attendees who are located at any number of locations. In a further example, an event is able to be a virtual gathering or meeting where attendees are able to be located in multiple rooms, attendees are able to connect remotely to a virtual presence server, or combinations of these. The device restricted event 100 is an example of an event during which electronic device carried by attendees of the event are required to have one or more temporary restrictions placed on some of their functions.

In some alternative examples, the device restricted events are able to be conducted with attendees who are not within a defined area, such as the room 102. For example, an alternative device restricted event that utilizes the systems and methods described below is able to occur in a virtual environment. Such alternative device restricted events are able to include virtual meetings where the attendees are able to be located in multiple rooms, where attendees are able to remotely connect to the activities of an event by various techniques, where attendees are able to be located and communicate by any suitable technique, or combinations of these.

The room 102 in an example defines a geographic location for a device restricted event 100. In various examples, a geographic location is able to be an enclosed area, such as the room 102, an open area, such as a patio, field or other outdoor region, other types of areas, or combinations of these.

The room 102 shows three people, a first person 106, a second person 108, and a host 110. The first person 106 has a first device 120, the second person 108 and a second device 122, and the host 110 has a host device 124. In this illustrated example, each of these devices is a portable electronic device. In further examples, any type of device that is within the room 102, or other area of an event, is able to have temporary restrictions placed on its functions for the duration of an event. In various examples, temporary restrictions are able to be placed on any type of device, including without limitation desktop computers, installed devices, devices located temporarily in the room 102, any other type of device, or combinations of these.

The room 102 is shown to have a door 140 as the only entrance into the room 102. A registration station 104 is positioned at the door 140 to allow attendees entering the room 102 through the door 140 to register their devices. In an example, the registration station 104 includes a Near Field Communications (NFC) device to allow attendees entering through the door 140 to "tap" the NFC device at the registration station 104 and register his or her device. In further examples, the host 110, or another person such as a security assistant, is able to be positioned near the door 140 and use his or her device as a registration device by which attendees can register their device via, for example, performing an NFC tap with the host device 124 or a device used by the other person such as the security assistant.

In the illustrated example, a user device control system 130 manages operating temporary restrictions on the user devices, such as the first device 120 and the second device 122. An example of a user device control system is a Mobile Device Management (MDM) system that may operate in conjunction with other enterprise Information Technology (IT) security servers and systems. The user device control system 130 communicates with user devices, such as the first device 120 and second device 122, via a data link 136. In an example, the data link 136 is able to include a secured Wi-Fi® data communications link. In further examples, the data link 136 is able to include any combination of wired communications links, wireless communications links, or other communications links.

The user device control system 130 exchanges enterprise defined device configurations with an IT policies storage 132. The IT policies storage 132 in an example stores enterprise Information Technology policy definitions that specify configurations for various user devices. The IT policies storage 132 in an example stores the device configurations that are to be imposed on user devices associated with an enterprise, as are able to be imposed via a Mobile Device Management system.

The user device control system 130 further receives device temporary restrictions specified by an event definition system 134. The event definition system 134 is an example of a system that creates or stores definitions for events that include, for example, parameters, attributes, other aspects, or combinations of these, for events such as the illustrated device restricted event 100. The event definition system 134 in an example provides a definition for an event to the user device control system 130 in order to cause the temporary restrictions defined for that event to be imposed on the devices brought into the event. In an example, the definition for the event is able to include, without limitation, one or more of an event start time, an event end time, a list of temporary restrictions for functions of devices brought into the event, a list of attendees, a specification of one or more hosts for the event, other information or aspects of the event, or any combination of these. In an example, a designated host for the event is able to modify, for example, temporary restrictions, attendees, or other information, about the event either before the event, during the event, or both.

Figure 2:
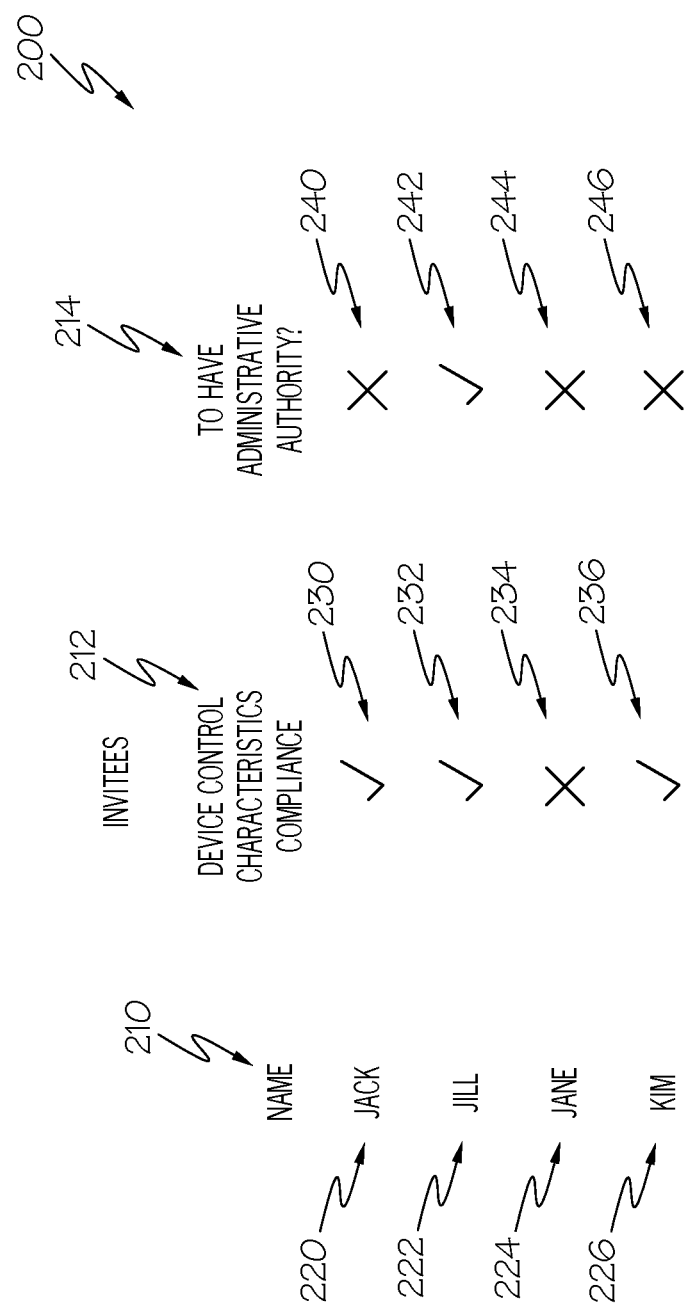
FIG. 2 illustrates an example event attendee list, according to an example.

FIG. 2 illustrates an example event attendee list 200, according to an example. The example event attendee list 200 depicts attendees for a planned event, such as the above described device restricted event 100. The example event attendee list 200 is able to be generated with data created or maintained by one or more of the above described event definition system 134, user device control system 130, other systems, or combinations of these.

The example event attendee list 200 includes a name column 210, a device control characteristics compliance column 212, and an administrative authority column 214. The name column 210 lists names of attendees. In various examples, a name column 210 is able to contain any one or more identifiers of each attendee, such as names, employee numbers, other identifiers, or combinations of these. The illustrated example event attendee list 200 includes four names, Jack 220, Jill 222, Jane 224, and Kim 226. Each of these names has an associated row of information that depicts information about that attendee related to the event.

The device control characteristics compliance column 212 reflects whether a user device associated with that attendee has appropriate control characteristics for the event. In an example, an event definition is able to specify various control characteristics that are required of devices brought into the event. For example, an event may specify that devices brought into the event are operating in compliance with the National Information Assurance Partnership (NIAP) requirements for that particular type of device. Operating in compliance with NIAP requirements in an example ensures that the device is able to reliably impose specified temporary restrictions on its functions as can be specified for various events. In an example, the data in the device control characteristics compliance column 212 is determined based upon a validated report received from each device associated with an attendee that indicates the capabilities of the device. In an example, Mobile Device Management (MDM) clients on each device are able to reliably determine and report the capabilities of each device, including whether the device has the specified control characteristics, such as NIAP compliance. In another example, a database of devices, such as may be stored by the user device control system 130, is able to store characteristics of each device, such as whether the device has the specified control characteristics.

The device control characteristics compliance column 212 includes a first device control characteristics compliance check mark 230 that indicates that Jack 220 has a mobile device that has the device control characteristics specified for the event. A second device control characteristics compliance check mark 232 and a third device control characteristics compliance check mark 236 indicate that Jill 222 and Kim 226 both also have devices that have device control characteristics specified for the event. A first device control characteristics compliance cross mark 234 indicates that Jane 224 has a device that does not have the device control characteristics specified for the event. In an example, Jane 224 may not be allowed to attend the event because her device does not have the device control characteristics specified for the event, or she may be required to leave the device outside of the event.

The example event attendee list 200 includes an Administrative Authority column 214. The Administrative Authority column 214 indicates whether the particular attendee will have administrative authority for the event. In an example, one or more event hosts are able to be given administrative authority for the event. The administrative authority in an example allows the particular attendee to define, modify, cancel, or otherwise control various aspects of the event. For example, an attendee with administrative authority is able to add or remove attendees for the event, add, remove, modify, or otherwise control temporary restrictions on functions of devices allowed into the event, perform other controls, or combinations of these. In an example, devices associated with individuals with administrative authority are able to be used to allow other attendees to register his or her device for the event, such as by an NFC tap. In various examples, individuals who will not attend the event are able to be given administrative authority for the event. In various examples, different individuals for a particular event are able to be given different types or levels of administrative authorities for the event.

The example event attendee list 200 has a first administrative authority cross mark 240 for Jack 220, a second administrative authority cross mark 244 for Jane 224, and a third administrative authority cross mark 246 for Kim 226. These cross marks indicate that these attendees do not have administrative authority for the event. A first administrative authority check mark 242 indicates that Jill 222 has administrative authority. In various examples, different individuals for a particular event are able to be given different types or levels of administrative authorities for the event. In some such examples, a specification of authorities that are provided to each individual is stored in an event attendee list as opposed to the mere "yes/no" indication for administrative authority as depicted by the example event attendee list 200.

Figure 3:
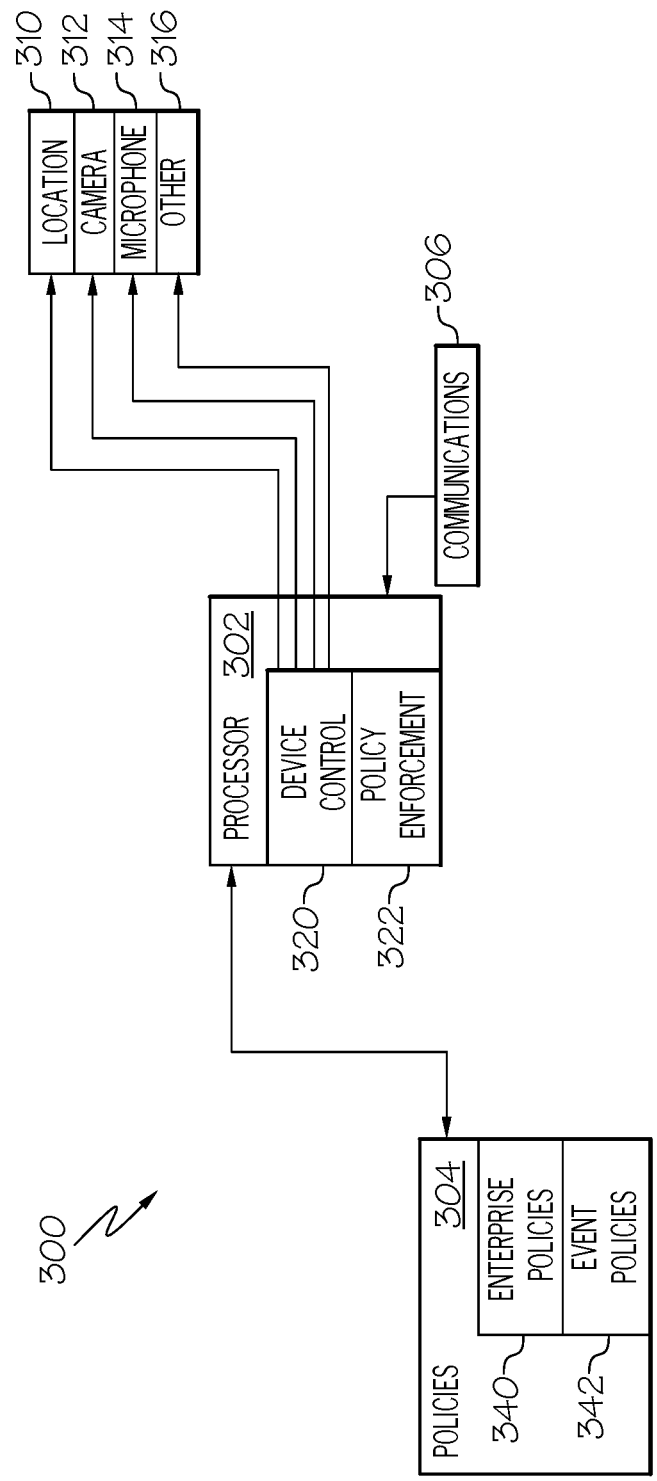
FIG. 3 illustrates an example user device block diagram, according to an example.

FIG. 3 illustrates an example user device block diagram 300, according to an example. The example user device block diagram 300 depicts an example of processing components within a user device that is able to be controlled in accordance with temporary restrictions specified for particular events. The example user device block diagram 300 depicts an example of components contained within the first device 120, second device 122, and the host device 124.

The example user device block diagram 300 includes a processor 302 that performs various computational or control functions associated with the operation of the example user device block diagram 300. In various examples, the processor 302 includes a memory to store data used to support the computations as well as to start program executable instructions use to direct the processing performed by processor 302. In various examples, processor 302 performs a number of functions associated with operation of an electronic device. In order to more concisely describe the relevant aspects of the systems and methods described herein, the following description focuses on processing associated with the temporary control of functions performed by electronic devices.

The example user device block diagram 300 includes a communications component 306. In various examples, the communications component 306 performs communications with other electronic devices over any suitable link. In some examples, the communication component 306 communicates via wireless data links of any suitable type. In further examples, the communications component is able to communicate over any one or more types of wireless communications links, wired communications links, other communications links, or combinations of those.

The example user device block diagram 300 includes a number of sensors that produce various types of information received by the processor 302. The processor 302 in various examples is able to perform any type of processing of the data received from these sensors. Information received from these sensors is able to be, for example, processed to present various derived information to a user of the example user device. In some examples, information received from these sensors is able to be relayed to other devices via the communications component 306.

A location sensor 310 is shown that in an example determines geographical locations of the device, such as in conjunction with the Global Positioning System (GPS) or similar radio navigation system. The location sensor 310 provides location information to the processor 302 for various processing. A camera 312 is able to capture images in an example and provide those images to the processor 302. A microphone 314 captures audio signals in the vicinity of the example user device and provides those signals in a suitable form to the processor 302. Other sensors 316 in an example operate to determine information in the environment of the example electronic device and then provide that information in a suitable format to the processor 302. In various examples, data received from these sensors is processed by the processor 302 and sent to other devices via the communications component 306. In an example, temporary restrictions specified to be imposed during events includes temporary restrictions on functions related to the operation of the sensors, such as the location sensor 310, camera 312, microphone 314 or other sensors 316. For example, temporary restrictions imposed during an event may prohibit the capturing, sending, or both, of images or sounds that could be captured by the camera 312 or microphone 314.

Two processing components, a device control component 320 and a policy enforcement component 322, are depicted as included in the illustrated processor 302. These components in an example include computer readable program code executed by the processor 302 to perform various functions. The device control component 320 operates to control the operation of various parts of the example user device. The device control component 320 in an example controls operation of the various sensors of the example user device, including the above described location sensor 310, camera 312 microphone 314 and other sensors 316.

The policy enforcement component 322 operates to implement IT policies defined for the example user device. In an example, the policy enforcement component 322 receives IT policies from a policies repository 304. The illustrated policy repository 304 includes enterprise polices 340, which are policies defined, for example, by an enterprise Information Technology (IT) department to define temporary restrictions on the operations of electronic devices used by persons associated with the enterprise. The illustrated policy repository 304 in this example includes event policies 342. The event policies in this example define temporary restrictions on functions performed by the processor 302 during defined events, as is defined in further detail below.

Figure 4:
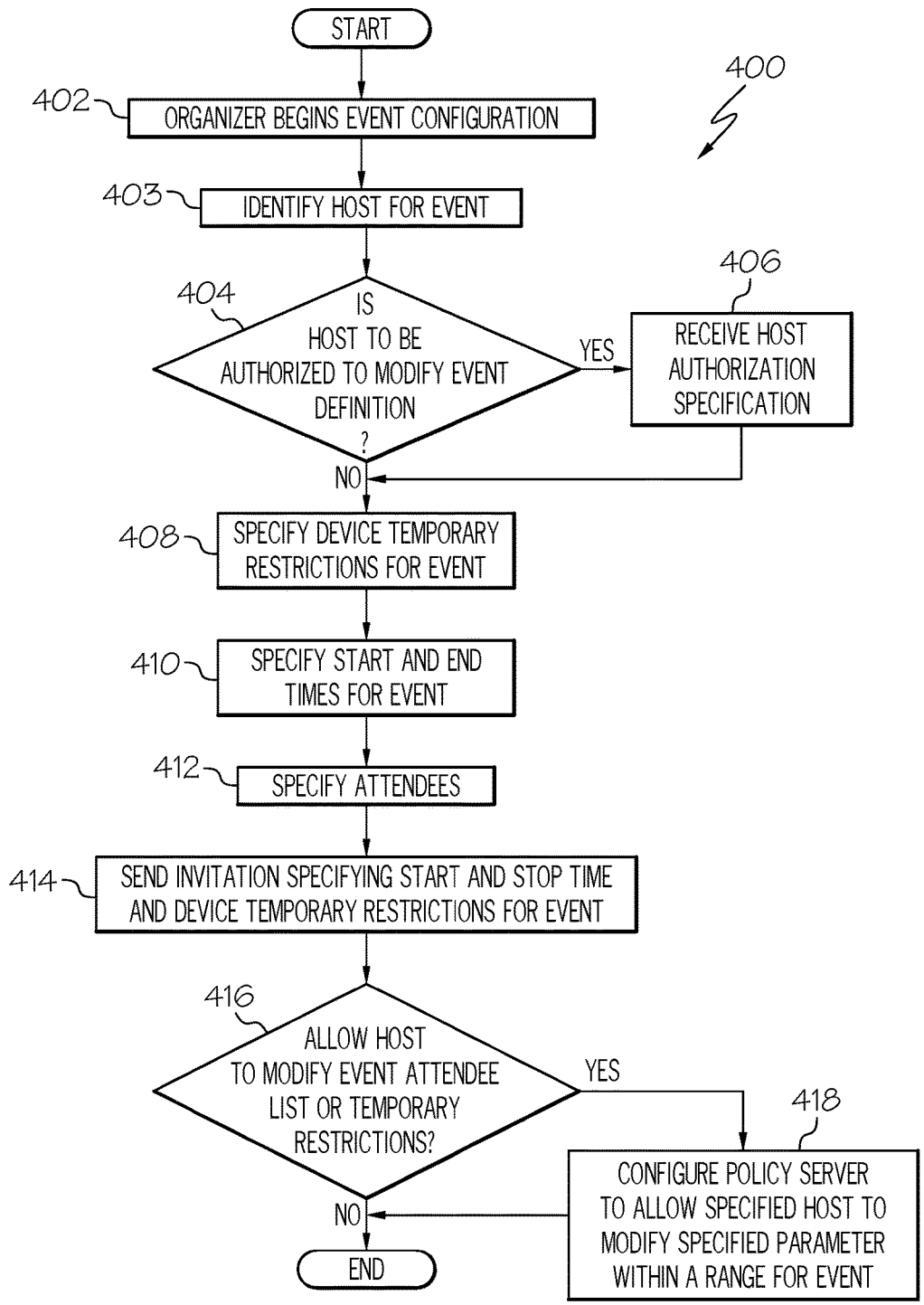
FIG. 4 illustrates an event definition process, according to an example.

FIG. 4 illustrates an event definition process 400, according to an example. The event definition process 400 is an example of a process that sets up, or defines, the relevant aspects of an event. In an example, an event organizer who is setting up the event performs the event definition process 400 to configure various elements of an enterprise Information Technology (IT) department to implement the temporary restrictions on functions performed by devices at the event. In an example, the event definition process 400 is performed via a user interface provided by an IT policy server adapted to implement device temporary restrictions during an event.

The event definition process 400 in an example starts when an organizer, at 402, begins configuring an event. In the following example, configuring an event includes defining an event definition that includes a time period during which temporary restrictions are imposed on devices brought into the event. In a further example, an "ad-hoc" event is able to be initiated by a host without having a pre-time period. Such ad-hoc events are able to be defined to occur between any suitable occurrences. In an example, an ad-hoc event is able to occur between times where attendees register their devices and de-register their devices. Examples of data that is able to be defined by an organizer in defining an event definition, but which are not required to define the event definition, include, without limitation, defining the temporary restrictions to be applied during the event, defining control characteristics for devices allowed into the event, defining the start time of the event, defining the end time of the event, or combinations of these.

The event definition process 400 in some examples identifies, at 403, one or more hosts for the event. In further examples, an event is able to not have a defined host. In an example, identification of one or more hosts is received from the organizer of the event. A determination, at 404, is made as to whether one or more hosts are to be authorized to modify the event definition. In some examples, one or more persons are able to be defined as hosts that are given privileges in a user device control system to modify some or all parameters in the definition of an event. For example, a device associated with such a host is able to be used to modify event attendee lists, modify temporary restrictions imposed on devices in the event, modify the start time of the event, modify the end time of the event, modify other parameters of the event, or combinations of these. If one or more hosts are to be an administrator, administrator specifications are received, at 406. In an example, administrator specifications include identifiers of individuals who are to be the hosts, specifications of the authorizations to be extended to each hosts, other specifications, or combinations of these. For example, administrator specifications may only allow devices associated with specified persons to modify temporary restrictions on cameras during the event.

The event definition process 400 specifies, at 408, device temporary restrictions to be imposed during the event. Specification of device temporary restrictions in an example is able to be provided by an event organizer. In further examples, device temporary restrictions for various categories of events are able to be stored by a system and selected by the organizer as these specifications.

A start time and an end time are specified, at 410, for the event. This specifies the time duration for which the temporary restrictions, specified above, are imposed on devices at the event.

Attendees for the event are specified in an example, at 412. Specifying a list of attendees in an example is able to restrict the persons to be admitted to the event. In a further example, specifying a list of attendees is merely a basis for informing those specified attendees of the event and is not used as a restriction for persons who are admitted into the event.

An invitation is sent, at 414, to the specified attendees. The invitation in an example includes the specified start time, specified end time, specified control characteristics for devices allowed into the event, and device temporary restrictions for the event. In an example, the device temporary restrictions specified in the invitation are able to be received by devices to be brought into the event and automatically imposed by the device during the specified time of the event (e.g., between the specified start time and the specified end time).

A determination is then made, at 416, if the host is allowed to modify the event attendee list or temporary restrictions to be imposed on devices. If this determining is true, a policy server in an example is configured, at 418, to allow the specified host to modify the specified parameters with a range for the event. In an example, this configuration may allow the host to add or delete a specified number of attendees to the event attendee list. In another example, the host may be specified to only be able to modify certain temporary restrictions of functions of devices, such as only allowing camera operations for a specified time duration during the event. The event definition process 400 then ends.

Figure 5:
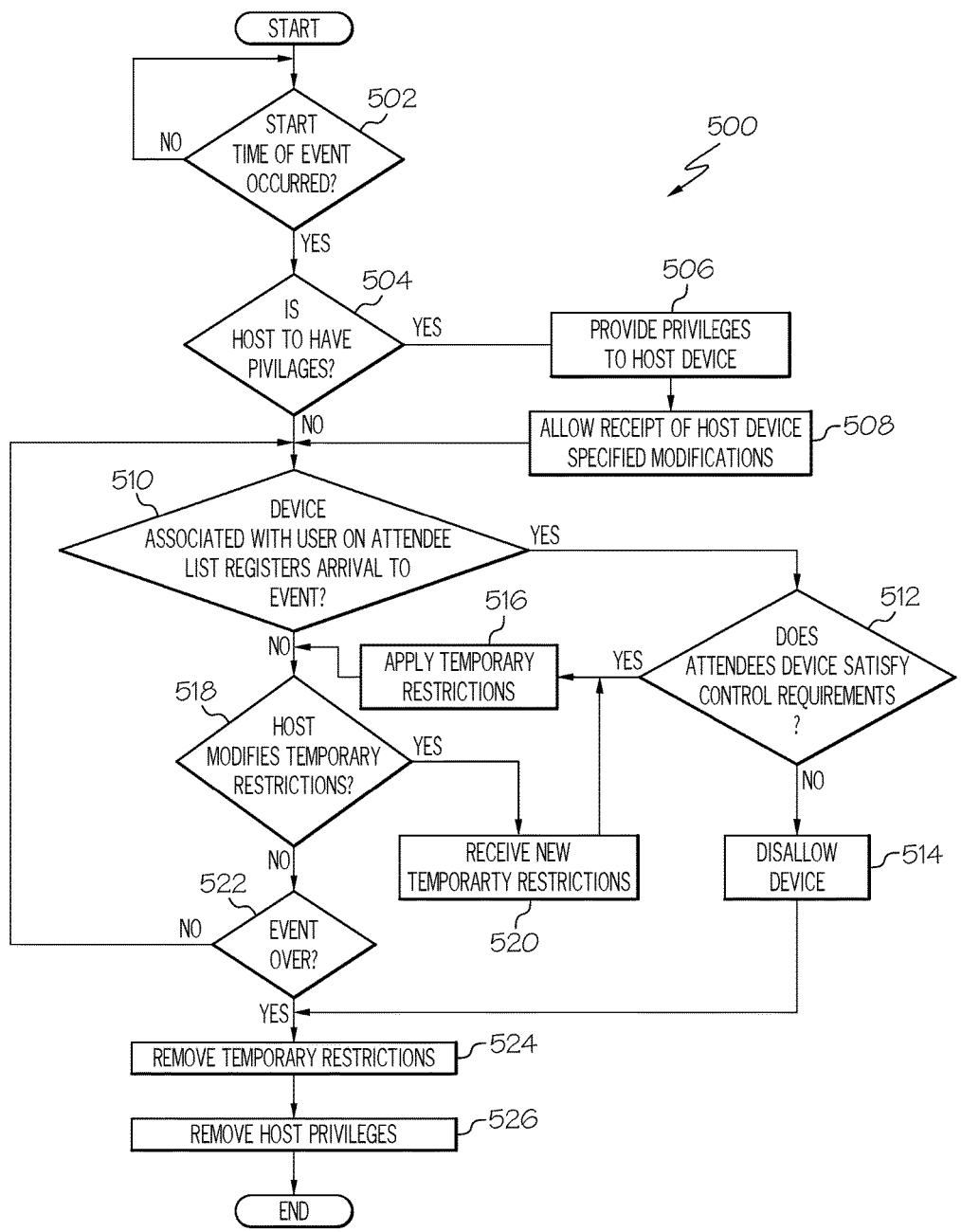
FIG. 5 Illustrates an event policy enforcement process, according to an example.

FIG. 5. Illustrates an event policy enforcement process 500, according to an example. The event policy enforcement process 500 is an example of a process performed by the policy enforcement component 322 described above.

The event policy enforcement process 500 determines, at 502, if a start time of an event has occurred. In an example, the time of event is determined based an occurrence of a specified start time for an event.

Once a time of an event has occurred, a determination is made, at 504, as to whether a host is to have privileges. In some examples, hosts are provided with privileges at various times, such as when an ad-hoc event is determined to have started. Examples of privileges provided to one or more hosts include modifying temporary restrictions on functions of devices, modification of event start time, end time, event attendee list, other aspects of the event, or combinations of these. In general, one or more persons are defined as a host to also allow attendees to resister their devices with one of the defined hosts. For example, an attendee is able to register his or her device by an NFC tap with a device associated with a defined host.

If it is so determined, the policy server in an example is configured, at 506, to provide the specified host with the specified privileges. Host defined modifications to the event specifications are configured to be allowed, at 508. In general, host defined temporary restrictions are able to be received from the one or more specified hosts at any time In some examples, the host may be limited to making such changes only during the event.

After determining a host is not to have privileges, or after allowing receipt of host device specified modification, a determination is made, at 510, as to whether a device associated with a user on attendee list for the event is registering its arrival at the event. Registration is able to be by any suitable technique, such as by that device making an NFC tap with a device associated with a host defined for the event. In some examples, an attendee list is defined for the event and registration of the device is only accepted if the device is associated with a user on the attendee list. In further examples, registration of a device is not based on the device being associated with a user on an attendee list. In various examples, the events may not have an attendee list or an attendee list is not a basis for accepting a device's registration, and is not a basis for applying temporary restrictions on the device during the event. Because receiving this registration is determined after determining the start time of the event, at 502, it is based on determining the occurrence of the start time of the event.

If it is determined that a device associated with an attendee registers, a determination is made, at 512, if the attendee's device satisfies the control requirements specified for the event. In some examples, it is able to specify that devices brought into an event are to have specified control characteristics, such as appropriate security configurations and verification of a secure operations state. In an example, the event definition may specify that all devices are to have an appropriate NIAP certification to ensure that their functions can be adequately and reliably restricted. This determination is also able to include requiring receipt of a validated report from the device verifying the integrity of operations to restrict its functions, such as verifying the integrity of the device's IT policy control components.

If this determination is that the device does not meet the requirements, the device is disallowed, at 514. By being disallowed, the holder of the device may have to leave the device outside of the event, or that holder may not be allowed admission to the event. In an example, a notification is provided that the device does not have the capability to implement the temporary restrictions. Such a notification is able to be provided in an example to a host, a guard, to other entities, to prevent the device from being brought into the event. For example, such notification to a guard at the event may cause the guard to not allow the attendee to enter, or to require the attendee to leave the device outside of the event.

If it is determined that the device satisfies the control requirements, the temporary restrictions specified for this event are applied, at 516. In an example, successful completion of the application of temporary restrictions is able to require receiving a validated report that the specified temporary restrictions have been imposed on the functions of the device. In an example, various Mobile Device Management platforms are able to provide a sufficiently validated and verified report to ensure the specified temporary restrictions have been reliably imposed.

After applying the temporary restrictions, or if no attendee is determined to register in this iteration, a determination is made, at 518, as to whether the host has modified any temporary restrictions. If the host has modified temporary restrictions, the new temporary restrictions are received, at 520, and those temporary restrictions are applied, at 516.

If the host has not modified temporary restrictions, a determination is made, at 522, as to whether the event is over. Determining if the event is over in an example is based on determining that the specified end time or the specified duration for the event has past. The end time for the event is able to be specified according to various techniques, such as specifying the end time directly, specifying an event duration that can be combined with the event start time to determine the end time, by other techniques, or by combinations of these. If it is determined that the event is not over, the event policy enforcement process 500 returns to determining, at 510, if an attendee device is registering its arrival at the event. If the event is determined to be over, the temporary restrictions specified for the event are removed, at 524. The host privileges are also removed, at 526. The event policy enforcement process 500 then ends.

Figure 6:
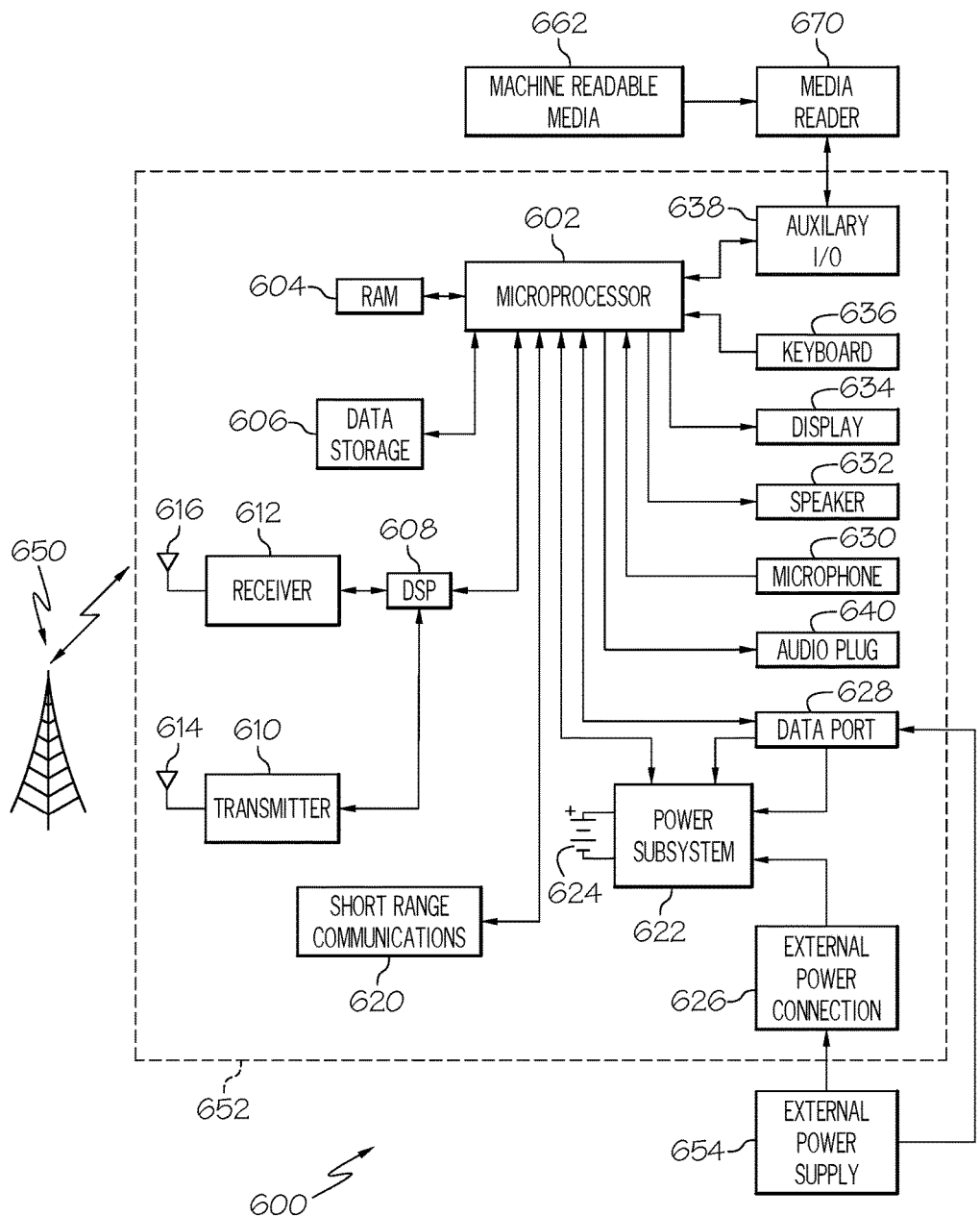
FIG. 6 is a block diagram of an electronic device and associated components in which the systems and methods disclosed herein may be implemented.

FIG. 6 is a block diagram of an electronic device and associated components 600 in which the systems and methods disclosed herein may be implemented. In some examples, electronic devices support data communications without supporting voice communications. For example, some electronic devices support data communications via a local data communications network, such as a WiFi® network. In some examples, devices may support voice communications via various techniques, such as Voice over Internet Protocol (VoIP), using systems such as BlackBerry Messenger® Voice, other voice over data systems, or combinations of these. Such electronic devices communicate with a wireless voice, text chat, or data network 650 using a suitable wireless communications protocol. Wireless voice communications are performed using either an analog or digital wireless communication channel. Data communications allow the electronic device 652 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 652 is an example electronic device that includes two-way wireless communications functions. Such electronic devices incorporate communication system elements such as a wireless transmitter 610, a wireless receiver 612, and associated components such as one or more antenna elements 614 and 616. A digital signal processor (DSP) 608 performs processing to extract data from received wireless signals and to generate signals to be transmitted. The particular design of the communication system is dependent upon the communication network and associated wireless communications protocols with which the device is intended to operate.

The electronic device 652 includes a microprocessor 602 that controls the overall operation of the electronic device 652. The above described processor 302 is an example of the microprocessor 602. The microprocessor 602 interacts with the above described communications system elements and also interacts with other device systems. In various examples, the electronic device 652 is able to include one or more of various components such as a data storage 606, random access memory (RAM) 604, auxiliary input/output (I/O) device 638, data port 628, display 634, keyboard 636, earpiece 632, media reader 670, microphone 630, a short-range communications system 620, a power system 622, an audio plug 640, other systems, or combinations of these.

One or more power storage or supply elements, such as a battery 624, are connected to a power system 622 to provide power to the circuits of the electronic device 652. The power system 622 includes power distribution circuitry for providing power to the electronic device 652 and also contains battery charging circuitry to manage recharging the battery 624 (or circuitry to replenish power to another power storage element). The power system 622 receives electrical power from external power supply 654. The power system 622 is able to be connected to the external power supply 654 through a dedicated external power connector (not shown) or through power connections within the data port 628. The power system 622 includes a battery monitoring circuit that is operable to provide a status of one or more battery status indicators, such as remaining capacity, temperature, voltage, electrical current consumption, and the like, to various components of the electronic device 652.

The data port 628 is able to support data communications between the electronic device 652 and other devices through various modes of data communications, such as high speed data transfers over optical communications circuits. Data port 628 is able to support communications with, for example, an external computer or other device. In some examples, the data port 628 is able to include electrical power connections to provide externally provided electrical power to the electronic device 652, deliver electrical power from the electronic device 652 to other externally connected devices, or both. Data port 628 of, for example, an electronic accessory is able to provide power to an electronic circuit, such as microprocessor 602, and support exchanging data between the microprocessor 602 and a remote electronic device that is connected through the data port 628.

Data communication through data port 628 enables a user to set preferences through the external device or through a software application and extends the capabilities of the device by enabling information or software exchange through direct connections between the electronic device 652 and external data sources rather than via a wireless data communication network. In addition to data communication, the data port 628 provides power to the power system 622 to charge the battery 624 or to supply power to the electronic circuits, such as microprocessor 602, of the electronic device 652.

Operating system software used by the microprocessor 602 is stored in data storage 606. Examples of data storage 606 are able to include, for example, flash memory, magnetic based storage devices, other volatile or non-volatile data store elements, or the like. Some examples are able to use data storage 606 that includes a battery backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604.

The microprocessor 602, in addition to its operating system functions, is able to execute software applications on the electronic device 652. A set of applications that control basic device operations, including at least data and voice communication applications, is able to be installed on the electronic device 652 during manufacture. In an example, programs and other data used to support the processes described above are able to be installed in the memory of the electronic device 652. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 652 through, for example, the wireless network 650, an auxiliary I/O device 638, Data port 628, short-range communications system 620, or any combination of these interfaces. Such applications are then able to be installed by a user in the RAM 604 or a non-volatile store for execution by the microprocessor 602.

In a data communication mode, a received signal such as a text message or web page download is processed by the communication system, including wireless receiver 612 and wireless transmitter 610, and communicated data is provided the microprocessor 602, which is able to further process the received data. In some examples, the electronic device 652 includes a display, output ports, or combinations of these. In such examples, the received data is able to be processed for output to the display 634, or alternatively, to an auxiliary I/O device 638 or the Data port 628. In examples of the electronic device 652 that include a keyboard 636 or other similar input facilities, a user of the electronic device 652 may also compose data items, such as e-mail messages, using the keyboard 636, which is able to include a complete alphanumeric keyboard or a telephone-type keypad, in conjunction with the display 634 and possibly an auxiliary I/O device 638. Such composed items are then able to be transmitted over a communication network through the communication system.

For voice communications, overall operation of the electronic device 652 is substantially similar, except that received signals are generally provided to an earpiece 632 and signals for transmission are generally produced by a microphone 630. Alternative voice or audio I/O systems, such as a voice message recording system, may also be implemented on the electronic device 652. Although voice or audio signal output is generally accomplished primarily through the earpiece 632, in examples of electronic devices 652 that include a display 634, the display 634 may also be used to provide an indication of the identity of a calling party, the duration of a voice call, or other voice call related information, for example.

Depending on conditions or statuses of the electronic device 652, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 620 provides for data communication between the electronic device 652 and different systems or devices, which need not necessarily be similar devices. For example, the short-range communications system 620 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 670 is able to be connected to an auxiliary I/O device 638 to allow, for example, loading computer readable program code of a computer program product into the electronic device 652 for storage into flash memory such as could be present in data storage 606. One example of a media reader 660 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 660 is alternatively able to be connected to the electronic device through the Data port 628 or computer readable program code is alternatively able to be provided to the electronic device 652 through the wireless network 650.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises some or all the features enabling the implementation of some or all of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of controlling functions, the method comprising:
   determining an occurrence of a start of an event, the event comprising a meeting of people occurring at a determined location, the event having associated control requirements for devices allowed into the event;
   based on determining the occurrence of the start of the event, receiving a respective registration of a respective device associated with a respective attendee of the event, each respective attendee being a person attending the meeting;
   confirming, based on receiving the registration, receipt of an authenticated report from the respective device, the authenticated report comprising a specification of control capabilities of the respective device and further comprising verification of the respective device's secure operational state;
   comparing the specification of control capabilities of the respective device and the verification of the respective device's secure operational state received in the authenticated report to the control requirements associated with the event;
   verifying, based on the comparing, compliance of the respective device with the control requirements for devices allowed into the event;
   applying, based on receiving the respective registration, determining the occurrence of the start of the event, and verifying compliance of the respective device, temporary restrictions to the respective device from which the respective registration is received;
   verifying, based on the applying, receipt of a validated report that the temporary restrictions have been imposed;
   providing, based on a failure in verifying compliance of the respective device, a notification to one of a host or a guard at the event that the respective device is not in compliance with the control requirements for devices allowed into the event; and
   removing, based on determining an occurrence of an end of the event, the temporary restrictions from the respective device.

2. The method of claim 1, further comprising:
   identifying a host for the event, the host being a person associated with the event; and
   providing authorization to a device associated the host to modify a list of attendees of the event and to modify the temporary restrictions, where authorization to modify a list of attendees comprises authorization to add and remove attendees from the event, and
   wherein applying temporary restrictions is further based on the respective attendee being on the list of attendees.

3. The method of claim 1, further comprising:
   receive an identification of a host for the event, the host being a person associated with the event; and
   providing authorization to a device associated with the host to modify at least one of the start of the event and the end of the event.

4. The method of claim 1, further comprising defining an event definition, where defining the event definition comprises:
   defining the temporary restrictions;
   defining control characteristics for devices entering the event;
   defining a start time of the event; and
   defining at least one of an end time of the event or a duration of the event.

5. The method of claim 1, further comprising sending an invitation to each attendee on a list of attendees, where the invitation comprises a specification of specified control characteristics for devices allowed into the event and the temporary restrictions, and
   wherein applying temporary restrictions is further based on the respective attendee being on the list of attendees.

6. The method of claim 1, further comprising:
   authenticating, at the respective device, characteristics of the respective device;
   verification of successful implementation of the temporary restrictions defined for the event; and
   providing a report verifying integrity of operations to implement the temporary restrictions and verifying integrity of policy control components of the respective device.

7. An apparatus for controlling functions on devices, the apparatus comprising:
   a processor that when operating, is adapted to:
   determine an occurrence of a start of an event, the event comprising a meeting of people occurring at a determined location, the event having associated control requirements for devices allowed into the event;
   based on a determination of the occurrence of the start of the event, receive a respective registration of a respective device associated with a respective attendee of the event, each respective attendee being a person attending the meeting;
   confirm, based on receipt of the registration, receipt of an authenticated report from the respective device, the authenticated report comprising a specification of control capabilities of the respective device and further comprising verification of the respective device's secure operational state;
   compare the specification of control capabilities of the respective device and the verification of the respective device's secure operational state received in the authenticated report to the control requirements associated with the event;
   verify, based on comparison of the specification of control capabilities and the verification of the respective device's secure operational state, compliance of the respective device with the control requirements for devices allowed into the event;
   apply, based on the respective registration, the occurrence of the start of the event, and verification of compliance of the respective device, temporary restrictions to the respective device from which the respective registration is received;

verify, based on application of temporary restrictions, receipt of a validated report that the temporary restrictions have been imposed;

provide, based on a failure to verify compliance of the respective device, a notification to one of a host or a guard at the event that the respective device is not in compliance with the control requirements for devices allowed into the event; and remove, based on a determination of an occurrence of an end of the event, the temporary restrictions from the respective device.

8. The apparatus of claim 7, the processor, when operating, being further adapted to:

receive an identification of a host for the event, the host being a person associated with the event; and provide authorization to a device associated with the host to modify a list of attendees of the event and to modify the temporary restrictions, where authorization to modify a list of attendees comprises authorization to add and remove attendees from the event, and wherein application of the temporary restrictions is further based on the respective attendee being on the list of attendees.

9. The apparatus of claim 7, the processor, when operating, being further adapted to:

receive an identification of a host for the event, the host being a person associated with the event; and provide authorization to a device associated with the host to modify at least one of the start of the event and the end of the event.

10. The apparatus of claim 7, the processor, when operating, being further adapted to define an event definition, where the event definition comprises:

the temporary restrictions;

control characteristics for devices entering the event;

a start time of the event; and at least one of an end time of the event or a duration of the event.

11. The apparatus of claim 7, the processor, when operating, being further adapted to send an invitation to each attendee on a list of attendees, where the invitation comprises a specification of specified control characteristics for devices allowed into the event and the temporary restrictions, and wherein application of the temporary restrictions is further based on the respective attendee being on the list of attendees.

12. A non-transitory computer readable storage medium having computer readable program code embodied therewith, the computer readable program code comprising instructions for:

determining an occurrence of a start of an event, the event comprising a meeting of people occurring at a determined location, the event having associated control requirements for devices allowed into the event;

based on determining the occurrence of the start of the event, receiving a respective registration of a respective device associated with a respective attendee of the event, each respective attendee being a person attending the meeting;

confirming, based on receiving the registration, receipt of an authenticated report from the respective device, the authenticated report comprising a specification of control capabilities of the respective device and further comprising verification of the respective device's secure operational state;

comparing the specification of control capabilities of the respective device and the verification of the respective device's secure operational state received in the authenticated report to the control requirements associated with the event;

verifying, based on the comparing, compliance of the respective device with the control requirements for devices allowed into the event;

applying, based on receiving the respective registration, determining the occurrence of the start of the event, and verifying compliance of the respective device, temporary restrictions to the respective device from which the respective registration is received;

verifying, based on the applying, receipt of a validated report that the temporary restrictions have been imposed;

providing, based on a failure in verifying compliance of the respective device, a notification to one of a host or a guard at the event that the respective device is not in compliance with the control requirements for devices allowed into the event; and removing, based on determining an occurrence of an end of the event, the temporary restrictions from the respective device.

13. The non-transitory computer readable storage medium of claim 12, the computer readable program code further comprising instructions for:

identifying a host for the event, the host being a person associated with the event; and providing authorization to a device associated the host to modify a list of attendees of the event and to modify the temporary restrictions, where authorization to modify a list of attendees comprises authorization to add and removes attendees from the event, and wherein applying temporary restrictions is further based on the respective attendee being on the list of attendees.

14. The non-transitory computer readable storage medium of claim 12, the computer readable program code further comprising instructions for:

receive an identification of a host for the event, the host being a person associated with the event; and providing authorization to a device associated with the host to modify at least one of the start of the event and the end of the event.

15. The non-transitory computer readable storage medium of claim 12, the computer readable program code further comprising instructions for defining an event definition, where the instructions for defining the event definition further comprises instructions for:

defining the temporary restrictions;

defining control characteristics for devices entering the event;

defining a start time of the event; and defining at least one of an end time of the event or a duration of the event.

16. The non-transitory computer readable storage medium of claim 12, the computer readable program code further comprising instructions for sending an invitation to each attendee on a list of attendees, where the invitation comprises a specification of specified control characteristics for devices allowed into the event and the temporary restrictions, and wherein applying temporary restrictions is further based on the respective attendee being on the list of attendees.

\* \* \* \* \*